United States Patent [19]
Omori

[11] Patent Number: 6,122,119
[45] Date of Patent: Sep. 19, 2000

[54] METHOD OF CORRECTING OUTPUT WAVEFORM OF HEAD AND MAGNETIC DISK UNIT

[75] Inventor: Hideki Omori, Kawasaki, Japan

[73] Assignee: Fujitsu Limited, Kawasaki, Japan

[21] Appl. No.: 08/965,258

[22] Filed: Nov. 6, 1997

[30] Foreign Application Priority Data

May 13, 1997 [JP] Japan ................................. 9-122592

[51] Int. Cl.[7] .................................................. G11B 5/09
[52] U.S. Cl. .............................. 360/46; 360/53; 360/31
[58] Field of Search ............................ 360/46, 53, 65, 360/51, 31

[56] References Cited

U.S. PATENT DOCUMENTS

| | | | |
|---|---|---|---|
| 5,517,369 | 5/1996 | Takeuchi et al. | 360/65 |
| 5,847,891 | 12/1998 | Ohmori et al. | 360/45 |

FOREIGN PATENT DOCUMENTS

| | | |
|---|---|---|
| 5-334802 | 12/1993 | Japan . |
| 8-31101 | 2/1996 | Japan . |
| 408083403 | 3/1996 | Japan . |
| 8-279247 | 10/1996 | Japan . |
| 9618189 | 6/1996 | WIPO . |

*Primary Examiner*—Paul Loomis
*Assistant Examiner*—Regina Y. Neal
*Attorney, Agent, or Firm*—Greer, Burns & Crain, Ltd.

[57] ABSTRACT

A method of correcting an output waveform of a head includes the steps of (a) obtaining a sample error value of a sample value when subjecting an analog signal output from a head to an analog-to-digital conversion, and (b) correcting a vertical asymmetry of a waveform of the analog signal when carrying out he analog-to-digital conversion by changing a corresponding relationship between the analog signal and a digital signal which is obtained by the analog-to-digital conversion based on the sample error value. The step (b) calculates a correction value with respect to the analog-to-digital conversion based on the sample error value, and changes an input range of the analog-to-digital conversion to become vertically asymmetric depending on the correction value.

18 Claims, 12 Drawing Sheets

FIG. 12

| HEAD | MRA (8 BITS) |
|---|---|
| 00 | 00h |
| 01 | 06h |
| 02 | F9h |
| ... | ... |
| 20 | 02h |

METHOD OF CORRECTING OUTPUT WAVEFORM OF HEAD AND MAGNETIC DISK UNIT

BACKGROUND OF THE INVENTION

The present invention generally relates to methods of correcting output waveforms of heads and magnetic disk units, and more particularly to a method of correcting an output waveform of a magneto-resistance (MR) head which is made up of a MR element that uses the magneto-resistive effect and outputs a waveform which is vertically asymmetrical about a horizontal axis, and to a magnetic disk unit which employs such a method of correcting the output waveform of the MR head.

In this specification, "a waveform which is vertically asymmetrical about the horizontal axis" is intended to mean that a waveform has a first portion on a positive polarity side of the vertical axis and a second portion on a negative polarity side of the vertical axis, and that the waveforms of the first and second portions are asymmetrical about the horizontal axis when the time base of at least one of the first and second portions is shifted to see if the first portion is a mirror image of the second portion with respect to the horizontal axis.

Recently, in magnetic disk units, the recording density of a magnetic disk has improved notably. Hence, a MR head made up of a MR element having a resistance which changes depending on the magnetic flux density has been proposed for use as a read head in order to cope with the improved recording density of the magnetic disk.

When reproducing recorded information from the magnetic disk using the MR head, a constant bias current is applied to the MR head. And when the magnetic flux density changes depending on the information recorded on the magnetic disk, the resistance of the MR element forming the MR head changes in accordance with the change in the magnetic flux density. As a result, the information read from the magnetic disk is output as a voltage via terminals of the MR head.

The output of the MR head that is obtained when reproducing the information recorded on the magnetic disk has a waveform that is vertically asymmetrical about the horizontal axis due to the characteristic of the MR head. In other words, the signal amplitude on a positive polarity side differs from that on a negative polarity side of the output waveform of the MR head. The vertical asymmetry of this vertically asymmetrical output waveform of the MR head differs depending on each individual MR head and is not constant even for the same make of MR heads.

The output waveform of the MR head is subjected to an analog-to-digital conversion process, a most likelihood decoding process and the like before the information recorded on the magnetic disk is finally reproduced. Hence, if the vertical asymmetry of the output waveform of the MR head is large, a sample error of the analog-to-digital conversion process occurs, that is, a difference between a sample value and a target value becomes large. In this case, an error is easily generated at a latter stage where the most likelihood decoding process is carried out, thereby causing an increase in the error rate of the magnetic disk unit.

The vertical asymmetry of the output waveform of the MR head tends to decrease when the bias current or sense current applied to the MR head increases. For this reason, the vertical asymmetry of the output waveform of the MR head is conventionally suppressed to a small value by increasing the bias current, that is, adjusting the bias current so that the error rate of the magnetic disk unit falls within a prescribed value.

However, when the bias current applied to the MR head increases, the bias current in most cases exceeds a prescribed value of the MR head and shortens the serviceable life of the MR head. In addition, in some MR heads, the vertical asymmetry of the output waveform of the MR head does not show a considerable improvement even if a large bias current is applied to the MR head.

On the other hand, when the bias current applied to the MR head does not exceed the prescribed value of the MR head, the vertical asymmetry of the output waveform of the MR head does not show a considerable improvement in most cases, and there was a problem in that it is difficult to improve the error rate of the magnetic disk unit in such cases.

SUMMARY OF THE INVENTION

Accordingly, it is a general object of the present invention to provide a novel and useful method of correcting output waveform of head and a magnetic disk unit, in which the problems described above are eliminated.

Another and more specific object of the present invention is to provide a method of correcting an output waveform of a head and a magnetic disk unit, wherein the vertical asymmetry of the output waveform of the head is positively corrected using a circuit having a relatively simple construction and without shortening the serviceable life of the head, so that the error rate of the magnetic disk unit is improved.

Still another object of the present invention is to provide a method of correcting an output waveform of a head, comprising the steps of (a) obtaining a sample error value by adding errors with respect to a ternary target value of a sample value when subjecting an analog signal output from a head to an analog-to-digital conversion, and (b) correcting a vertical asymmetry of a waveform of the analog signal based on the sample error value when carrying out the analog-to-digital conversion. According to the method of the present invention, the vertical asymmetry of the output waveform of the head is positively corrected using a circuit having a relatively simple construction and without shortening the serviceable life of the head, so that the error rate of a magnetic disk unit is improved.

A further object of the present invention is to provide a magnetic disk unit comprising at least one head reading a signal from a magnetic disk, an analog-to-digital converter subjecting an analog signal output from the head to an analog-to-digital conversion, and a sample error measuring circuit measuring a sample error value by adding errors with respect to a ternary target value of a sample value when subjecting the analog signal to the analog-to-digital conversion, based on an output of the analog-to-digital converter, wherein the analog-to-digital converter corrects a vertical asymmetry of a waveform of the analog signal based on the sample error value when carrying out the analog-to-digital conversion.

Other objects and further features of the present invention will be apparent from the following detailed description when read in conjunction with the accompanying drawings.

BRIEF DESCRIPTION OF THE DRAWINGS

FIG. 12 is a diagram showing an adjusting value table.

DESCRIPTION OF THE PREFERRED EMBODIMENTS

Figure 1:
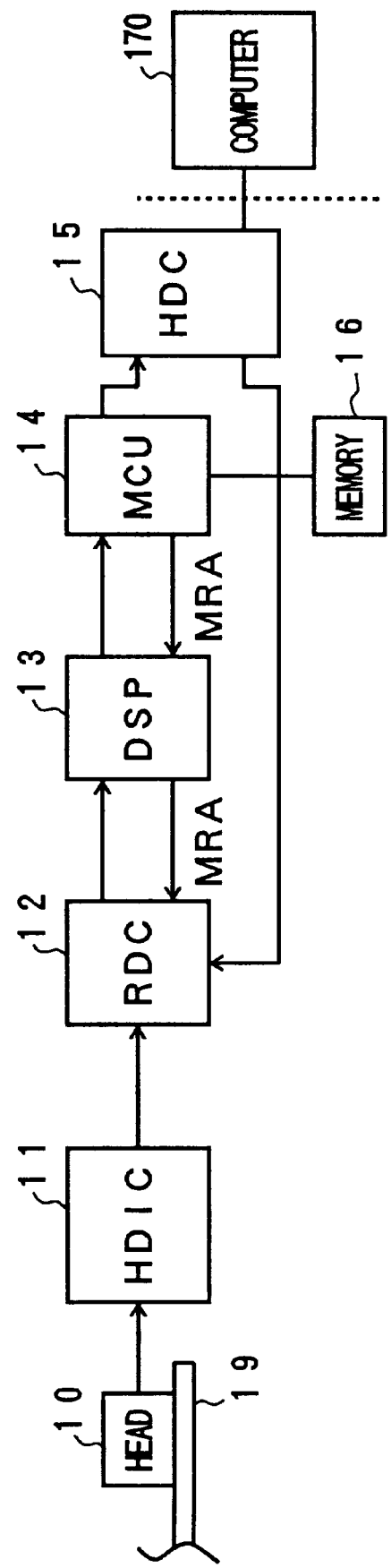
FIG. 1 is a system block diagram showing the general construction of an embodiment of a magnetic disk unit according to the present invention.

FIG. 1 is a system block diagram showing the general construction of an embodiment of a magnetic disk unit according to the present invention. The magnetic disk unit shown in FIG. 1 generally includes a head integrated circuit (HDIC) 11, a read channel (RDC) 12, a digital signal processor (DSP) 13, a microcomputer unit (MCU) 14, a head disk controller (HDC) 15, and a memory 16. For example, the hard disk controller 15 is coupled to a personal computer 170 which uses the magnetic disk unit as a storage unit.

When a read request is received from the personal computer 170, the hard disk controller 15 sets the read channel 12 to a read mode. As a result, a signal read from a magnetic disk 19 by a MR head 10 is subjected to processes such as amplification within the head IC 11 and is then supplied to the read channel 12. As will be described later, the read channel 12 subjects the read signal to an analog-to-digital (A/D) conversion process, a decoding process and the like, and outputs a digital data by reproducing the signal recorded on the magnetic disk 19. The digital data from the read channel 12 is supplied to the hard disk controller 15 via the DSP 13 and the MCU 14, and is further transferred to the personal computer 170.

As will be described later, the read channel 12 includes a sample error measuring circuit which measures the sample error of an A/D converter within the read channel 12, and the measured sample error is supplied to the MCU 14 via the DSP 13. The memory 16 stores programs to be executed by the MCU 14 and data. The MCU 14 calculates a correction value MRA which is used to correct the output waveform of the MR head 10 which is vertically asymmetrical about the horizontal axis, based on the measured sample error value. This correction value MRA is set in the read channel 12 via the DSP 13.

Figure 2:
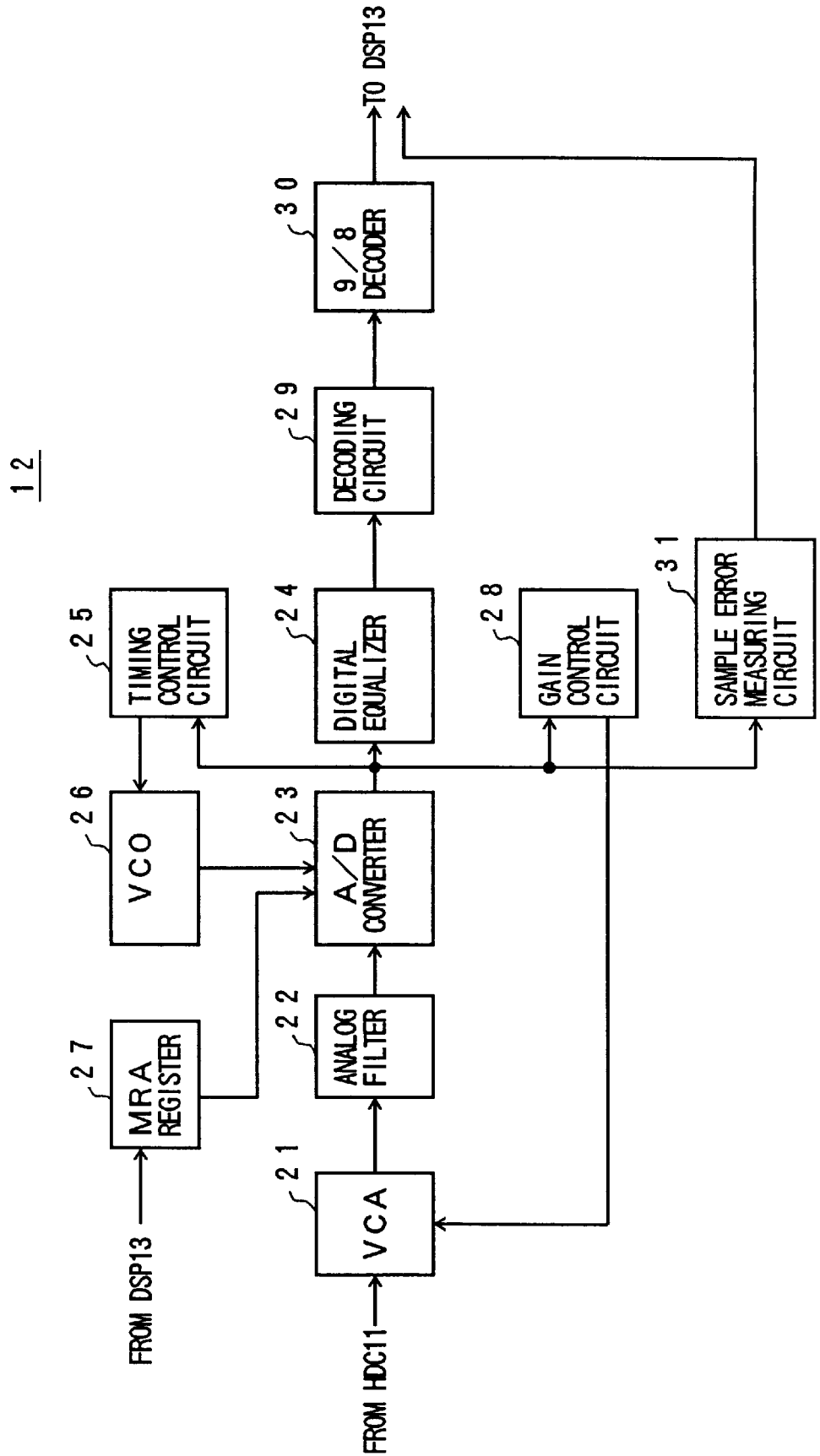
FIG. 2 is a system block diagram showing the general construction of a read channel.

FIG. 2 is a system block diagram showing the general construction of the read channel 12. The read channel 12 shown in FIG. 2 generally includes a voltage controlled amplifier 21, an analog filter 22, an A/D converter 23, a digital equalizer 24, a timing control circuit 25, a voltage controlled oscillator 26, a MRA register 27, a gain control circuit 28, a most likelihood decoding circuit 29, a 9/8 decoder 30, and a sample error measuring circuit 31.

The voltage controlled amplifier 21, the analog filter 22, the A/D converter 23 and the gain control circuit 28 form a gain control loop. This gain control loop controls the input signal amplitude of the A/D converter 23 so that the A/D converter 23 samples a target value. The A/D converter 23, the timing control circuit 25 and the voltage controlled oscillator 26 form a phase locked loop (PLL) for adjusting the sampling timing. This sampling timing adjusting PLL controls the sampling timing of the A/D converter 23.

The A/D converter 23 receives a signal from the head IC 11 via the voltage controlled amplifier 21 and the analog filter 22, and supplies an output digital signal to the digital equalizer 24. The digital equalizer 24 subjects the output digital signal of the A/D converter 23 to a waveform equalization process, and an equalized digital signal is decoded into a serial digital data by the most likelihood decoding circuit 29. In addition, the 9/8 decoder 30 decodes the serial digital data from the most likelihood decoding circuit 29 into parallel digital data, and supplies the parallel digital data to the DSP 13 shown in FIG. 1.

The gain control loop itself and the sampling timing adjusting PLL itself are known, and a detailed description of these loops will be omitted in this specification.

As will be described later, the correction value MRA which is used to correct the vertically asymmetric output waveform of the MR head 10 is set in the MRA register 27 from the DSP 13. The A/D converter 23 makes an adjustment based on the correction value MRA so as to cancel the vertical asymmetry of the output waveform of the MR head 10. In addition, the sample error measuring circuit 31 measures the sample error of the A/D converter 23 used to calculate the correction value MRA, that is, the difference between the sample value and the target value.

Figure 3:
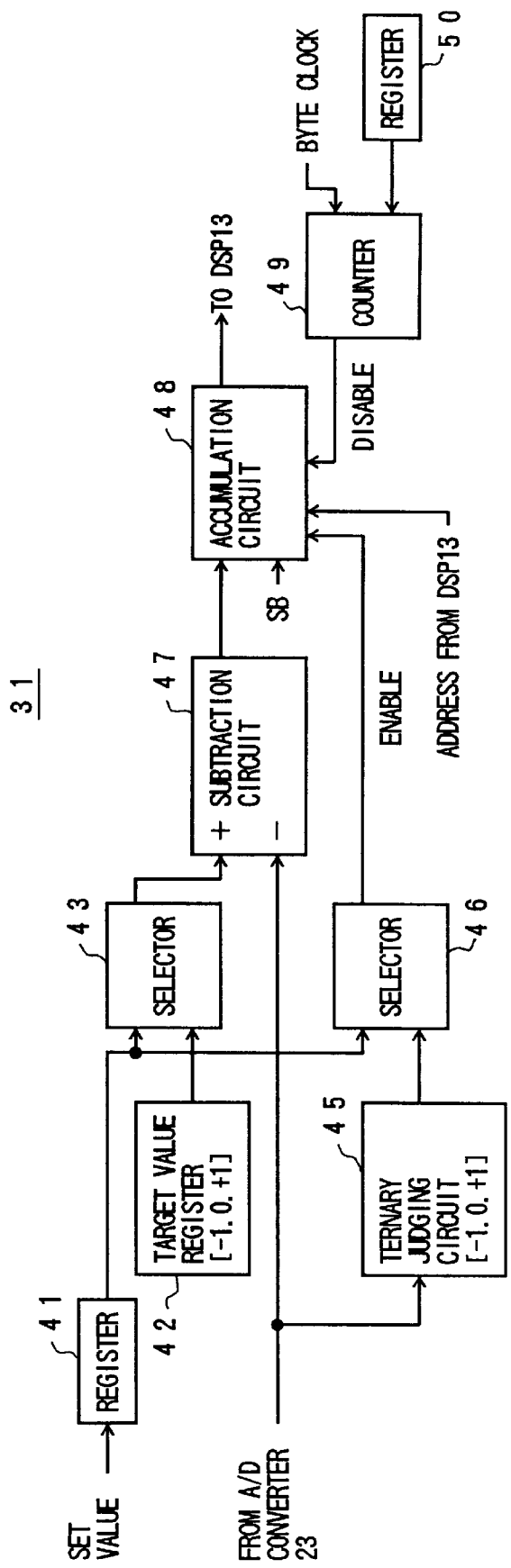
FIG. 3 is a system block diagram showing an embodiment of a sample error measuring circuit.

FIG. 3 is a system block diagram showing an embodiment of the sample error measuring circuit. The sample error measuring circuit 31 shown in FIG. 3 generally includes a register 41, a target value register 42, a selector 43, a ternary judging circuit 45, a selector 46, a subtraction circuit 47, an accumulation circuit 48, a counter 49, and a register 50.

When measuring the sample error by the sample error measuring circuit 31, a value "0" is set in the MRA register 27 shown in FIG. 2, so that the sample error is measured in a state where no correction is carried out with respect to the vertical asymmetry of the output waveform of the MR head 10.

A set value for selecting one of target values "−1", "0" and "+1" of the A/D conversion that is carried out by the A/D converter 23 is set in the register 41. The set value can be set from the MCU 14 shown in FIG. 1 to the register 41 via the DSP 13. The set value set in the register 41 is supplied to the selectors 43 and 46. The target values "−1", "0" and "+1" from the target value register 42 are supplied to the selector 43, and the target value corresponding to the set value is output from the selector 43. The digital signal from the A/D converter 23 shown in FIG. 2 is supplied to the ternary judging circuit 45 and the subtraction circuit 47. The ternary judging circuit 45 judges whether the value of the digital signal received from the A/D converter 23 is "−1", "0" or "+1", and supplies a judged value to the selector 46. The selector 46 supplies an enable signal to the accumulation circuit 48 if the judged value received from the ternary judging circuit 45 matches the set value received from the register 41.

The subtraction circuit 47 subtracts the value of the output digital signal of the A/D converter 23 from the output target value of the selector 43, and supplies a subtraction result to the accumulation circuit 48. A synchronization byte detection signal SB is supplied to a clear terminal of the accumulation circuit 48. Data patterns recorded on the magnetic disk 19 include a synchronization byte pattern, and a known SB detection circuit (not shown) which detects this synchronization byte pattern is provided within the read channel 12. The synchronization byte detection signal SB is obtained from the SB detection circuit. In a state where the output enable signal of the selector 46 is supplied to the accumulation circuit 48, that is, in an enabled state of the accumulation circuit 48, the cleared state of the accumulation circuit 48 is cancelled in response to the synchronization byte detection signal SB when the SB detection circuit detects the synchronization byte pattern, and the accumulation circuit 48 starts an accumulation process. By carrying out this accumulation process, the accumulation circuit 48 successively adds the subtraction result received from the subtraction circuit 47.

On the other hand, the counter 49 counts a byte clock which is received from the MCU 14 shown in FIG. 1 or from a clock generator which is not shown. When a counted value of the counter 49 reaches a number of measured bytes set in the register 50, the counter 49 supplies a disable signal to the accumulation circuit 48. The number of measured bytes can be set in the register 50 from the MPU 14 shown in FIG. 1 via the DSP 13. The accumulation circuit 48 stops the accumulation process in response to the disable signal, and outputs, as a sample error value, an accumulated value at the time when the accumulation process is stopped. The accumulation circuit 48 includes a register, and the sample error value is read from this register and is supplied to the DSP 13 shown in FIG. 1 by specifying an address of this register from the MCU 14 via the DSP 13.

The sample error value has the same number of bytes with respect to each of the three target values "−1", "0" and "+1". The sample error values with respect to the three target values are desirably obtained while the MR head 10 scans the same region on the magnetic disk 19.

Figure 4:
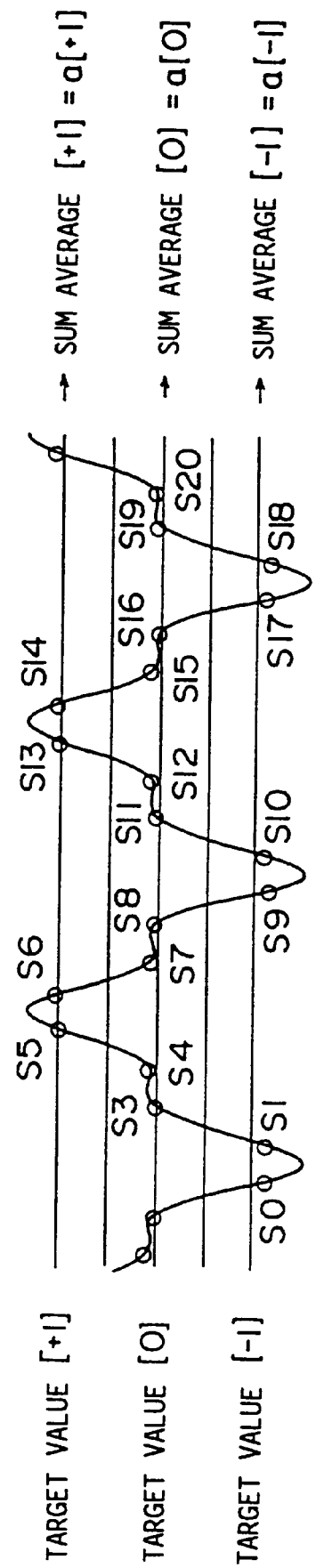
FIG. 4 is a diagram showing an input waveform of an analog-to-digital converter.

The MCU 14 calculates the correction value MRA as follows based on the sample error value which is obtained via the DSP 13. FIG. 4 is a diagram showing the input waveform of the A/D converter 23. In FIG. 4, S0 through S20 indicate sampling points of the A/D converter 23. In the following description, a sum average "+1" of the sampling points corresponding to the target value "+1" is denoted by a[+1], a sum average "0" of the sampling points corresponding to the target value "0" is denoted by a[0], and a sum average "−1" of the sampling points corresponding to the target value "−1" is denoted by a[−1]. Accordingly, an amplitude Vop(+) of the positive polarity portion of the input waveform of the A/D converter 23 and an amplitude Vop(−) of the negative polarity portion of the input waveform of the A/D converter 23 can respectively be calculated from the following formulas (1) and (2) based on the sample error value described above.

$$Vop(+)=(+1)+a[+1]-a[0] \qquad (1)$$

$$Vop(-)=a[0]-(-1)-a[-1] \qquad (2)$$

In addition, the vertical asymmetry of the input waveform of the A/D converter 23, that is, a vertical asymmetry Asym of the output waveform of the MR head 10, can be described by the following formula (3).

$$Asym = \{Vop(+) - Vop(-)\} / \{Vop(+) + Vop(-)\} \qquad (3)$$
$$= \{a[+1] + a[-1] - 2a[0]\} / \{2 + a[+1] - a[-1]\}$$

The correction value MRA can be described by the following formula (4) if a power supply voltage VDD is 3.3 V, and a twos complement mra of the correction value MRA takes a value between −128 and 127 which are described in 8 bits, for example.

$$MRA=\{(mra/128)+1\}*(VDD/4) \qquad (4)$$

In addition, a correction quantity ASYM which is used to correct the vertical asymmetry of the waveform can be described by the following formula (5) if a high-level input range of the A/D converter 23 is denoted by VRH and a low-level input range of the A/D converter 23 is denoted by VRL.

$$ASYM=\{(VRH+VRL)/2-MRA\}/\{(VRH-VRL)/2\} \qquad (5)$$

Accordingly, in a case where the output waveform of the MR head 10 has the vertical asymmetry Asym, the correction value MRA is set so that ASYM=Asym stands. Hence, the correction value MRA can be calculated from the following formula (6) based on the formulas (1) through (5) described above.

$$MRA=[\{(VRH+VRL)-Asym\cdot(VRH-VRL)\}*2*VDD-1]*128 \qquad (6)$$

The correction value MRA which is calculated in the above described manner is set in the MRA register 27 within the read channel 12.

Figure 5:
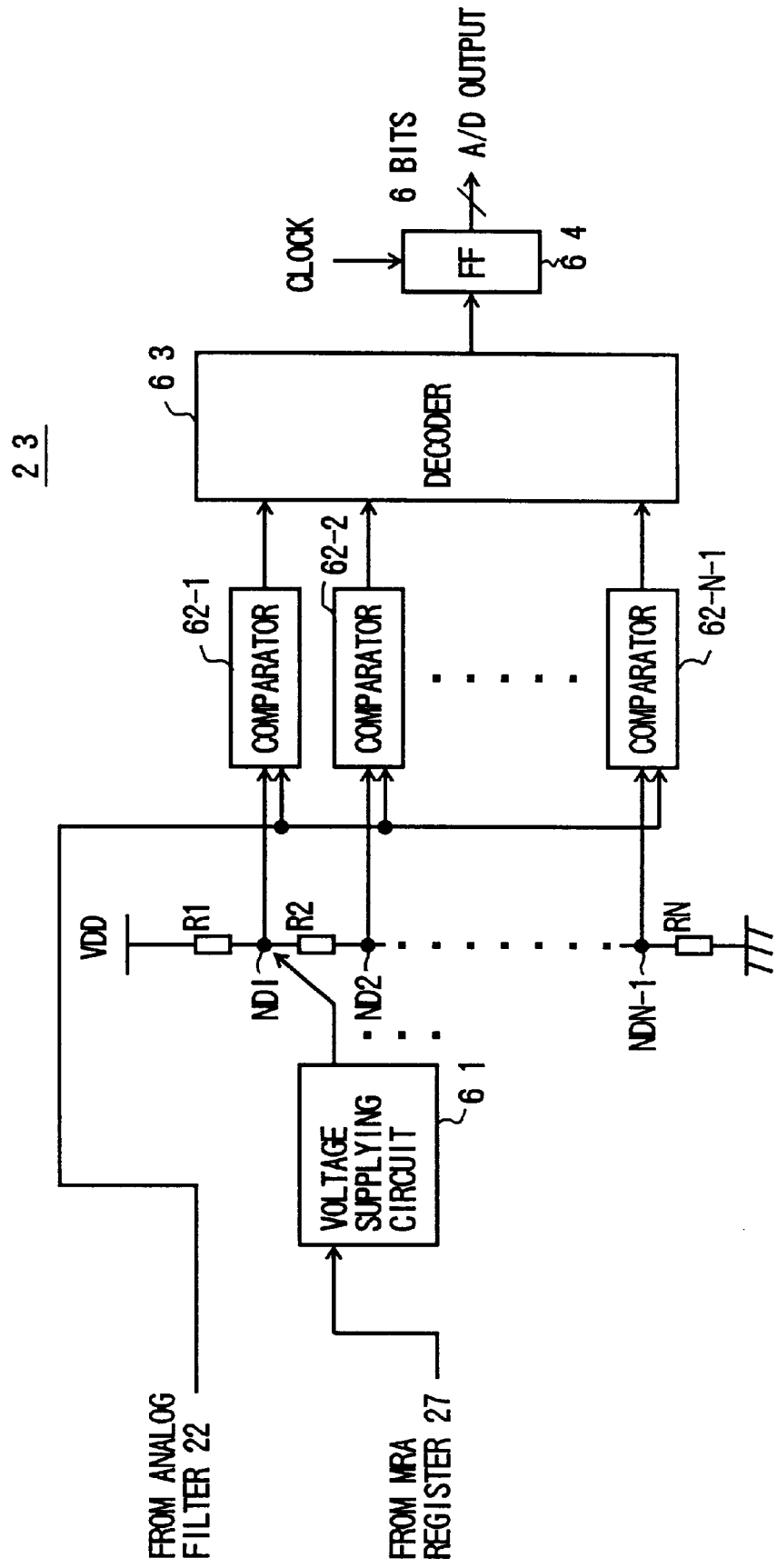
FIG. 5 is a system block diagram showing an embodiment of the analog-to-digital converter.

FIG. 5 is a system block diagram showing an embodiment of the A/D converter 23. The A/D converter 23 shown in FIG. 5 generally includes a voltage supplying circuit 61, resistors R1 through RN, comparators 62-1 through 62-N-1, a decoder 63, and a flip-flop 64 which are connected as shown. The correction value MRA from the MRA register 27 is supplied to the voltage supplying circuit 61. This voltage supplying circuit 61 supplies a voltage which is ½ a reference voltage to one of nodes ND1 through NDN-1 corresponding to the correction value MRA, that is, a node NDi. The resistors R1 through RN are connected in series between the reference voltage source and the ground. In this embodiment, the reference voltage is set to the power supply voltage VDD which is 3.3 V, and thus, the power supplying circuit 61 supplies a voltage VDD/2.

The signal received from the analog filter 22 is supplied to each of the comparators 62-1 through 62-N-1. In addition, signals from the corresponding nodes ND1 through NDN-1 are supplied to the comparators 62-1 through 62-N-1. Each of the comparators 62-1 through 62-N-1 outputs a signal indicating the size relationship of the two signals supplied thereto, and the signal from each of the comparators 62-1 through 62-N-1 is supplied to the decoder 63. The decoder 63 obtains and outputs a digital value of the input signal to the A/D converter 23 based on the output signals of the comparators 62-1 through 62-N-1, and the flip-flop 64 outputs the digital value from the decoder 63 at a timing depending on a clock which indicates a sampling timing. This clock is obtained from the MCU 14 shown in FIG. 1 or from a clock generator which is not shown.

Figure 6C:
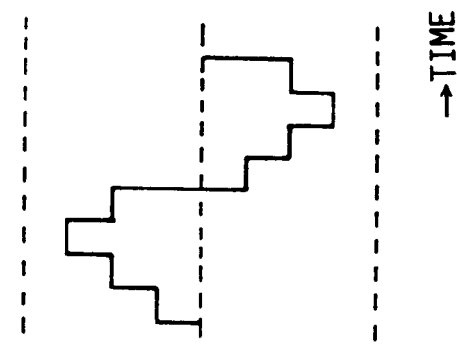
FIGS. 6A, 6B and 6C respectively are diagrams for explaining the operation of the analog-to-digital converter.
Figure 6B:
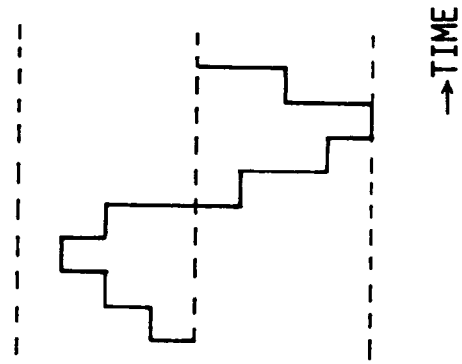
Figure 6A:
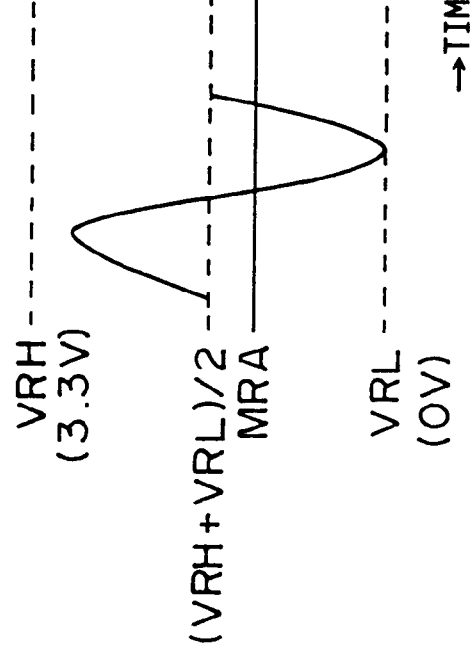

Since the voltage supplying circuit 61 supplies the voltage which is ½ the reference voltage to the node NDi corresponding to the correction value MRA out of the nodes ND1 through NDN-1, it is possible to correct the vertical asymmetry of the input signal waveform of the A/D converter 23 depending on the correction value MRA when decoding the output signals of the comparators 62-1 through 62-N-1 in the decoder 63. In other words, it is possible to change the input range of the A/D converter 23 to have a vertical asymmetric characteristic based on the correction value MRA. As a result, in a case where the input signal waveform of the A/D converter 23 is as shown in FIG. 6A, the output signal waveform of the A/D converter 23 becomes as shown in FIG. 6B if the vertical asymmetry of the input signal waveform of the A/D converter 23 is not corrected, but the output signal waveform of the A/D converter 23 becomes as show in FIG. 6C according to this embodiment because the vertical asymmetry of the input signal waveform of the A/D converter 23 is corrected in this embodiment. As may be seen by comparing FIGS. 6B and 6C, the vertical asymmetry of the input signal waveform of the A/D converter 23 is corrected in the output signal waveform of the A/D converter 23 according to this embodiment.

In the embodiment described above, it is assumed for the sake of convenience that only one MR head 10 is provided. But in a case where a plurality of MR heads, that is, read heads, are provided with respect to a plurality of magnetic disks, it is possible to correct the vertical asymmetry of the output waveform for each MR head, similarly as in the embodiment described above.

Figure 7:
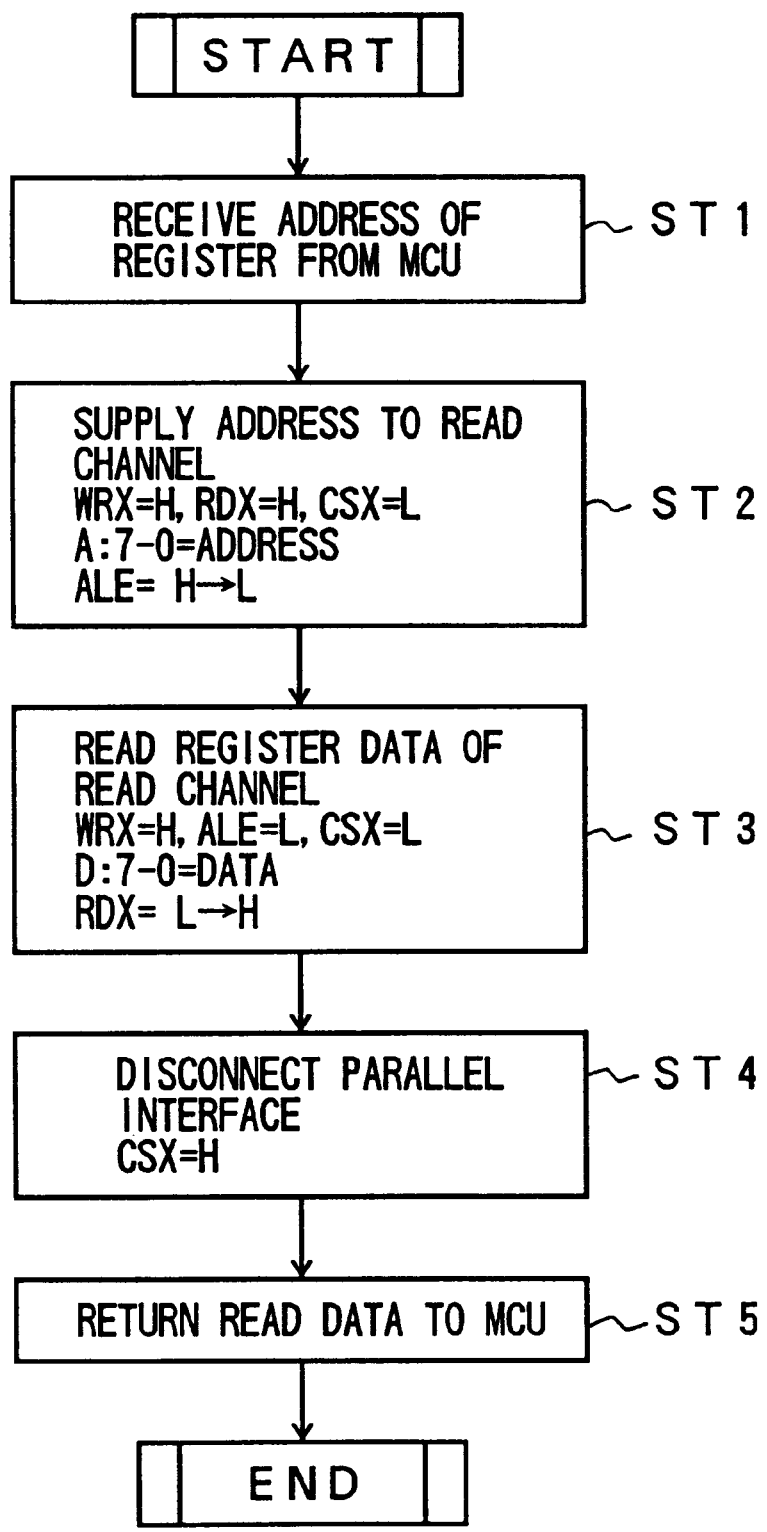
FIG. 7 is a flow chart for explaining a read operation of a digital signal processor from a register.
Figure 8:
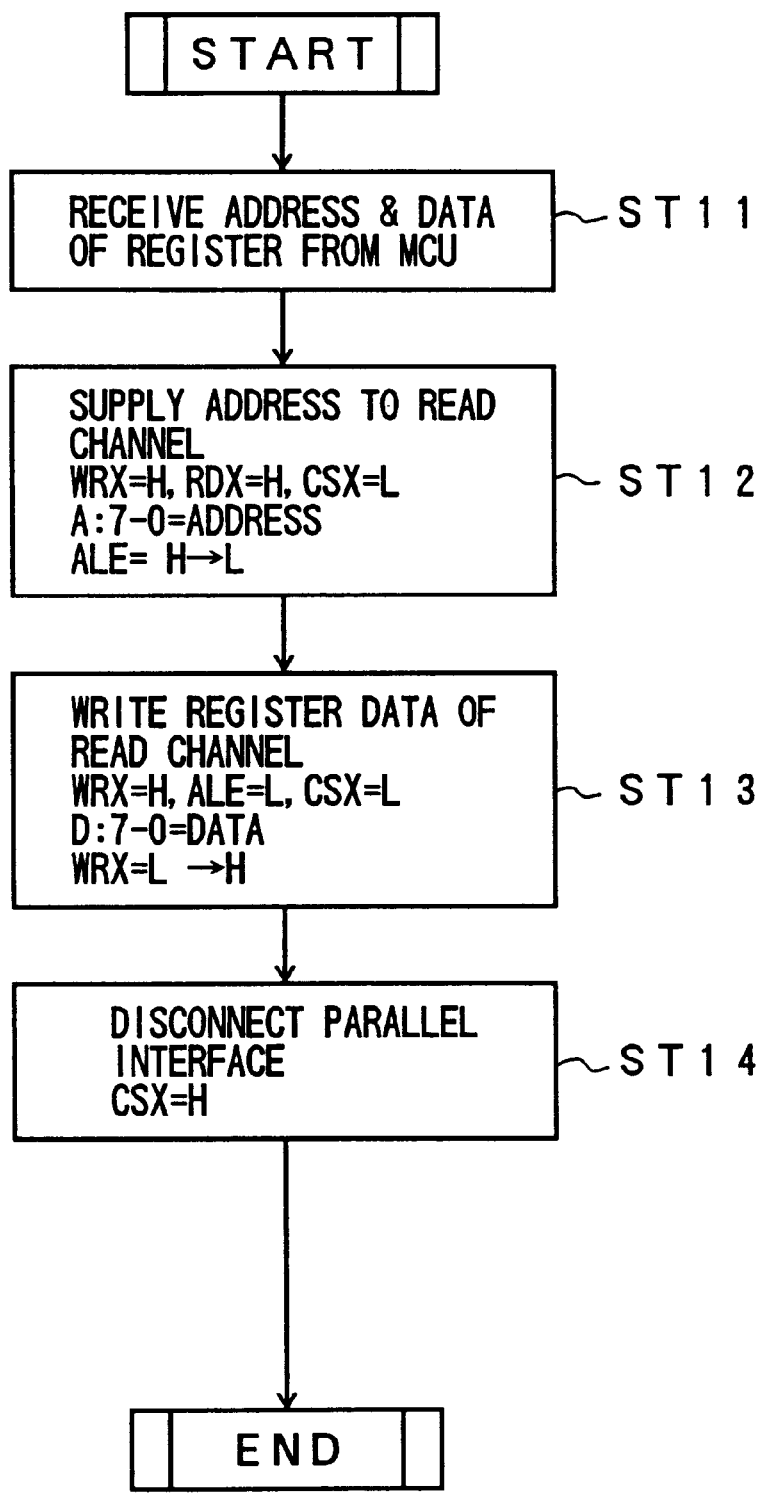
FIG. 8 is a flow chart for explaining a write operation of the digital signal processor to registers.
Figure 9:
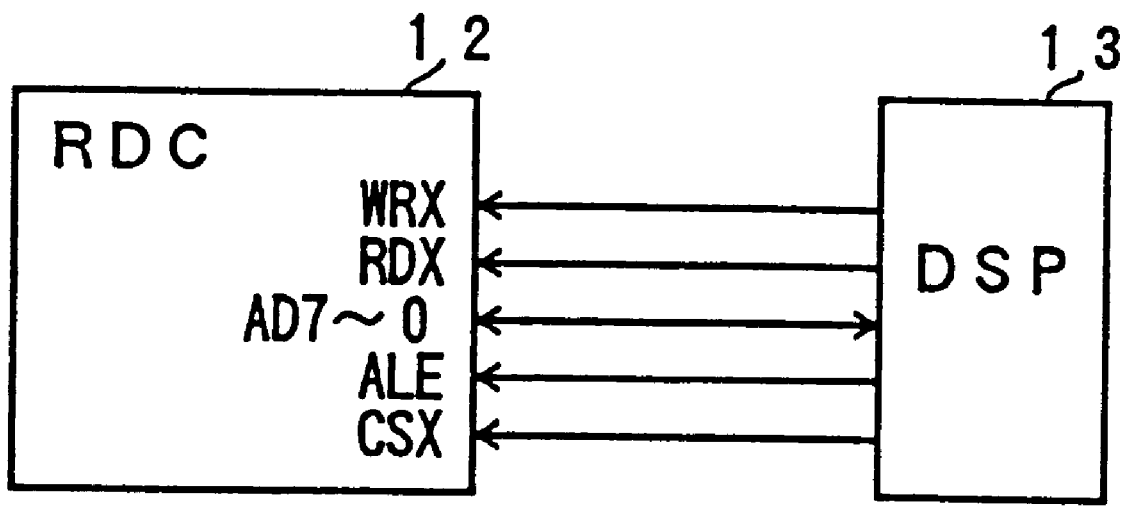
FIG. 9 is a system block diagram showing a parallel interface between the read channel and the digital signal processor.
Figure 10:
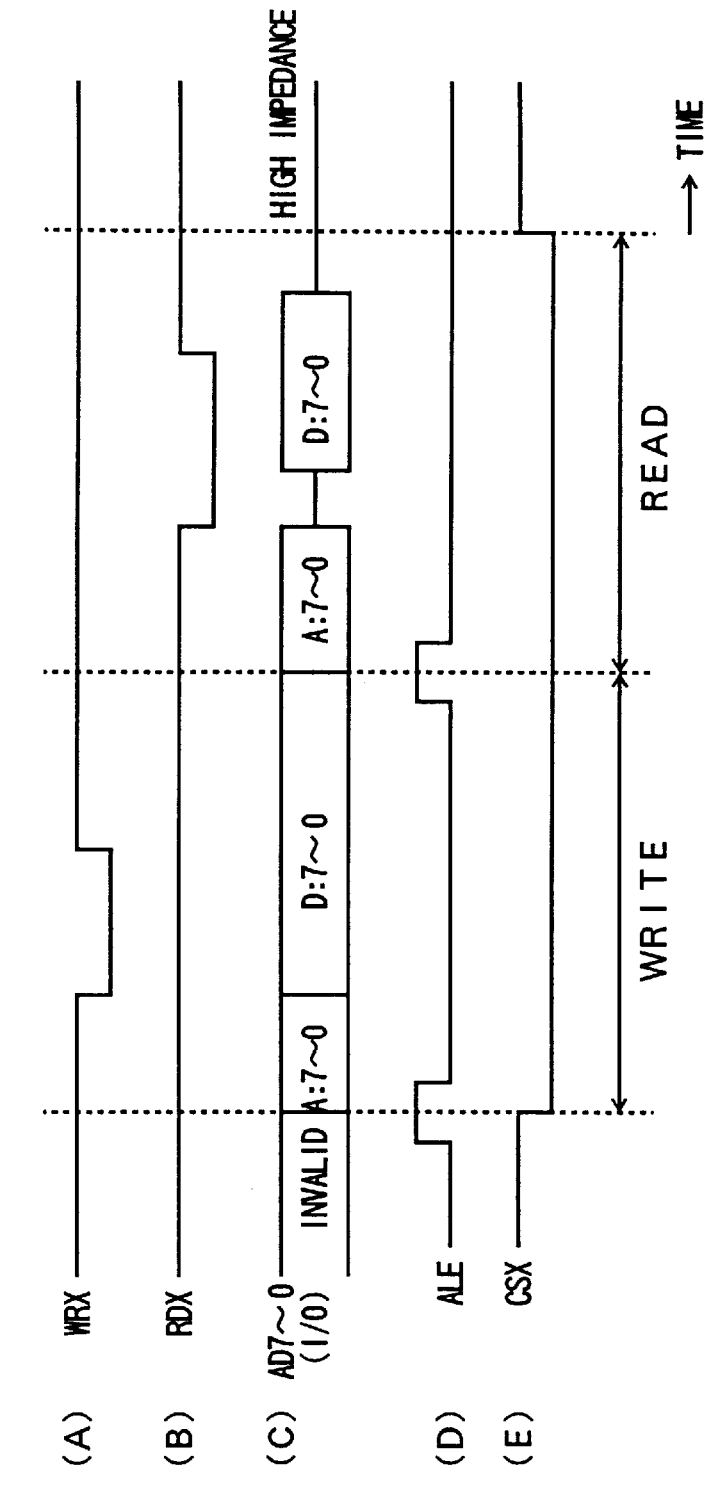
FIGS. 10(A) through 10(E) respectively are time charts for explaining the operation of the parallel interface.

Next, a description will be given of accesses made by the DSP 13 to the registers 27, 41, 48 and 50 within the read channel 12, by referring to FIGS. 7 through 10. FIG. 7 is a flow chart for explaining a read operation of the DSP 13 from the register 48. FIG. 8 is a flow chart for explaining a write operation of the DSP 13 to the registers 27, 41 and 50. FIG. 9 is a system block diagram showing a parallel interface between the read channel 12 and the DSP 13. In addition, FIGS. 10(A) through 10(E) are time charts for explaining the operation of the parallel interface.

In FIG. 7, a step ST1 receives an address of the register 48 within the read channel 12 from the MCU 14. A step ST2 supplies the address of the register 48 to the read channel 12. The parallel interface between the read channel 12 and the DSP 13 has a construction shown in FIG. 9.

In FIG. 9, WRX indicates a write signal which has a high level when making a write to the registers 41 and 50 within the read channel 12, RDX indicates a read signal which has a high level when making a read from the registers 41, 48 and 50 within the read channel 12. In addition, AD7 to AD0 indicate address/data, ALE indicates a signal which has a low level when the read channel 12 recognizes the address AD7 to AD0, and CSX indicates a chip select signal which has a low level when the registers 41, 48 and 50 are accessible.

Accordingly, in the step ST2 shown in FIG. 7, the write signal WRX has a high level as shown in FIG. 10(A), the read signal RDX has a high level as shown in FIG. 10(B), the chip select signal CSX has a low level as shown in FIG. 10(E), the address A7 to A0 is obtained as shown in FIG. 10(C), and the signal ALE makes a transition from a high level to a low level as shown in FIG. 10(D).

A step ST3 reads the sample error value from the register 48 within the read channel 12. In this state, the write signal WRX has a high level as shown in FIG. 10(A), the signal ALE has a low level as shown in FIG. 10(D), the chip select signal CSX has a low level as shown in FIG. 10(E), the data D7 to D0 is obtained as shown in FIG. 10(C), and the read signal RDX makes a transition from a low level to a high level as shown in FIG. 10(B).

A step ST4 disconnects the parallel interface. Hence, the chip select signal CSX makes a transition from a low level to a high level as shown in FIG. 10(E). In addition, a step ST5 supplies the sample error value read from the MRA register 27 to the MCU 14, and the process ends.

In FIG. 8, a step ST11 receives from the MCU 14 addresses of the registers 27, 41 and 50 within the read channel 12 and data to be written into these registers 27, 41 and 50. A step ST12 supplies the addresses of the registers 27, 41 and 50 to the read channel 12. In this case, in the step ST12, the write signal WRX has a high level as shown in FIG. 10(A), the read signal RDX has a high level as shown in FIG. 10(B), the chip select signal CSX has a low level as shown in FIG. 10(E), the address A7 to A0 is obtained as shown in FIG. 10(C), and the signal ALE makes a transition from a high level to a low level as shown in FIG. 10(D).

A step ST13 writes the data to the registers 27, 41 and 50 within the read channel 12. In this state, the read signal RDX has a high level as shown in FIG. 10(B), the signal ALE has a low level as shown in FIG. 10(D), the chip select signal CSX has a low level as shown in FIG. 10(E), the data D7 to D0 is obtained as shown in FIG. 10(C), and the write signal WRX makes a transition from a low level to a high level as shown in FIG. 10(A).

A step ST14 disconnects the parallel interface, and the process ends. Hence, the chip select signal CSX makes a transition from a low level to a high level as shown in FIG. 10(E).

Next, a description will be given of the operations of the MCU 14 and the personal computer 170, by referring to a flow chart shown in FIG. 11.

Figure 11:
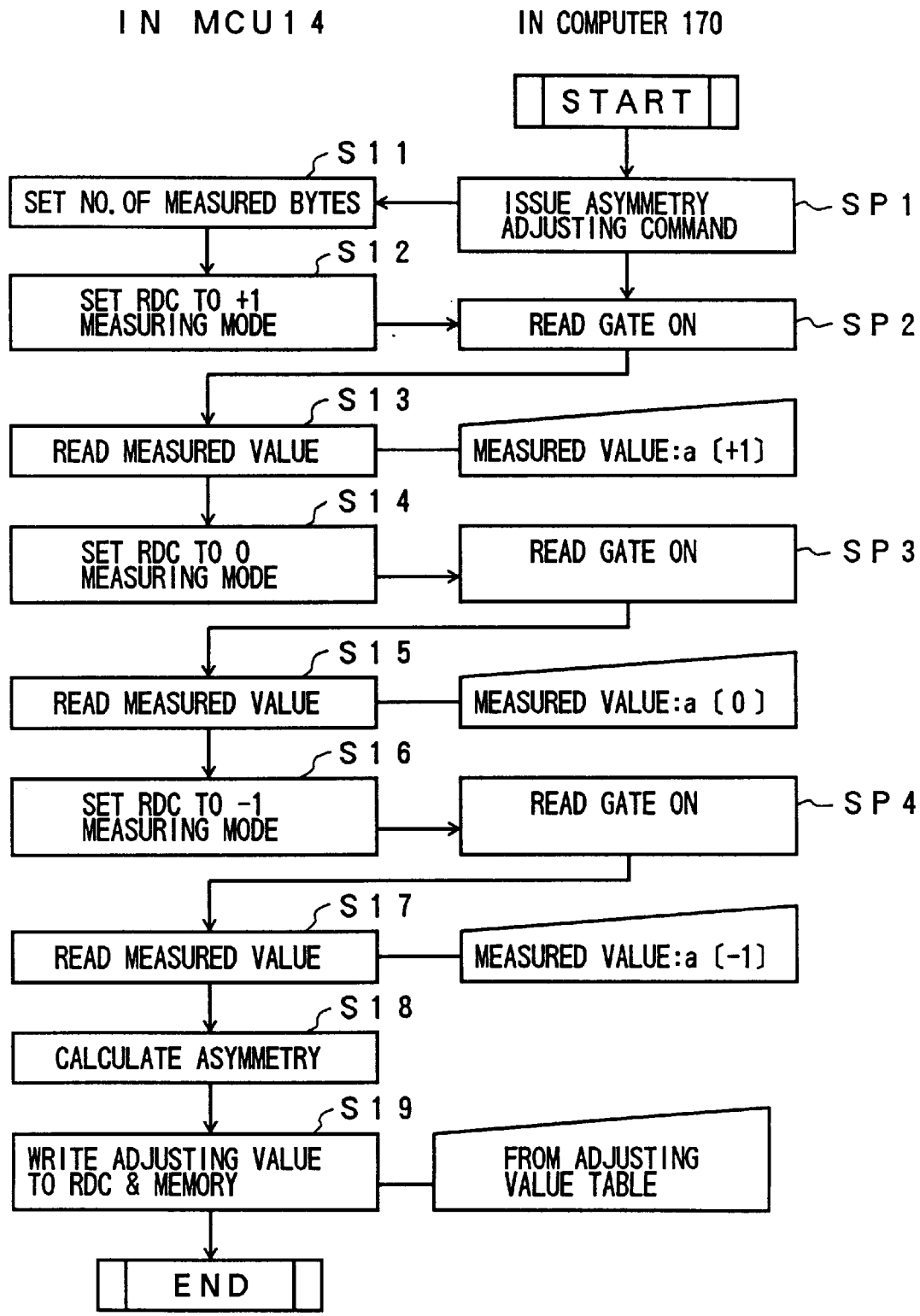
FIG. 11 is a flow chart for explaining the operation of a microcomputer unit and a personal computer.

In FIG. 11, when the operation of the personal computer 170 is started, a step SP1 issues an asymmetry adjusting command with respect to the MCU 14. This asymmetry adjusting command instructs adjustment of the vertical asymmetry of the output waveform of the MR head 10. The asymmetry adjusting command is supplied to the MCU 14 via the hard disk controller 15. In the MCU 14, in response to the asymmetry adjusting command, a step S11 sets the number of measured bytes in the register 50 of the sample error measuring circuit 31 within the read channel 12. This setting of the number of measured bytes to the register 50 is carried out according to the process shown in FIG. 8 described above. In addition, in the MCU 14, a step S12 sets the set value "+1" in the register 41 of the sample error measuring circuit 31 within the read channel 12. This setting of the set value to the register 41 is also carried out according to the process shown in FIG. 8 described above.

When the setting of the registers 50 and 41 by the steps S11 and S12 ends, in the personal computer 170, a step SP2 turns a read gate ON, that is, enables the operation of the entire sample error measuring circuit 31 shown in FIG. 3. In this embodiment, the MCU 14 by itself cannot put the sample error measuring circuit 31 within the read channel 12 to the enabled state, and the step SP2 is provided for this reason. However, in a case where the MCU 14 by itself can put the sample error measuring circuit 31 to the enabled state, this step SP2 and steps SP3 and SP4 which will be described later may be omitted.

In the MCU 14, a step S13 reads the measured sample error value from the register (accumulation circuit) 48 of the sample error measuring circuit 31 within the read channel 12. This reading of the sample error value from the register 48 is carried out according to the process shown in FIG. 7 described above. In this case, the sample error value with respect to the sum average a[+1] is read by the MCU 14.

Next, in the MCU 14, a step S14 sets a set value "0" in the register 41 of the sample error measuring circuit 31 within the read channel 12. This setting of the set value to the register 41 is carried out according to the process shown in FIG. 8 described above. After the setting the set value to the register 41 by the step S14 ends, in the personal computer 170, a step SP3 turns the read gate ON, that is, enables the operation of the entire sample error measuring circuit 31 shown in FIG. 3. In the MCU 14, a step S15 reads the measured sample error value from the register 48 of the sample error measuring circuit 31 within the read channel 12. This reading of the sample error value from the register is carried out according to the process shown in FIG. 7 described above. In this case, the sample error value with respect to the sum average a[0] is read by the MCU 14.

In the MCU 14, a step S16 sets the set value "−1" in the register 41 of the sample error measuring circuit 31 within the read channel 12. This setting of the set value to the register 41 is carried out according to the process shown in FIG. 8 described above. When the setting of the set value to the register 41 by the step S16 ends, in the personal computer 170, a step SP4 turns the read gate ON, that is, enables the operation of the entire sample error measuring circuit 31 shown in FIG. 3. In the MCU 14, a step S17 reads the measured sample error value from the register 48 of the sample error measuring circuit 31 within the read channel 12. This reading of the sample error value from the register 48 is carried out according to the process shown in FIG. 7 described above. In this case, the sample error value with respect to the sum average a[−1] is read by the MCU 14.

In the MCU 14, a step S18 obtains the correction value MRA by calculating the formulas (3) and (6) described above using the sample error values read in the steps S13, S15 and S17. In the MCU 14, a step S19 writes the correction value MRA obtained in the step S18 to the memory 16 shown in FIG. 1 and to the MRA register 27 within the read channel 12 shown in FIG. 2. The writing of the correction value MRA to the MRA register 27 is carried out according to the process shown in FIG. 7 described above.

Figure 12:
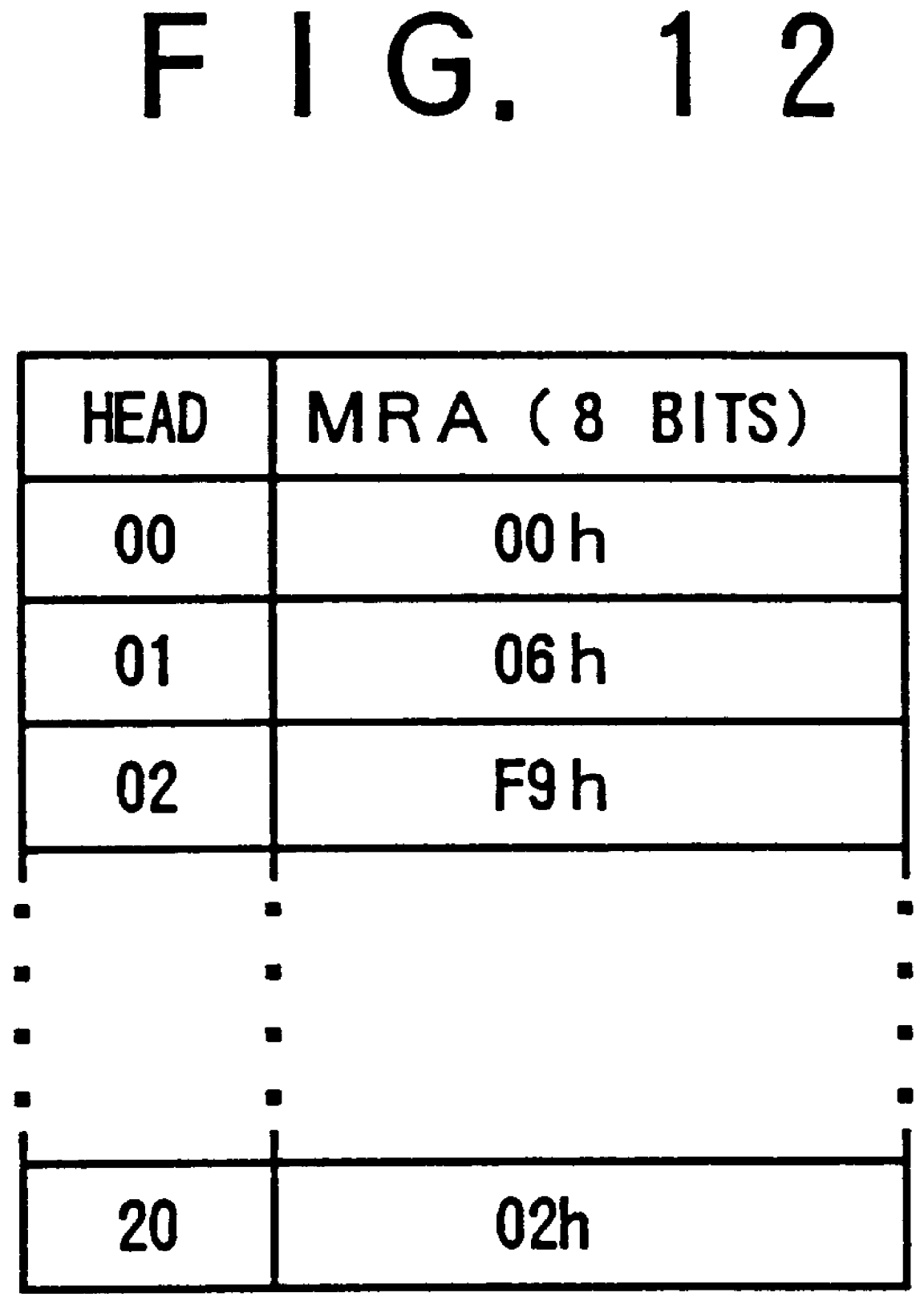

In a case where a plurality of MR heads 10 are provided in the magnetic disk unit, it is possible to store the correction values MRA with respect to each of the MR heads 10 in the memory 16 in the form of a MRA table shown in FIG. 12. In the MRA table shown in FIG. 12, 8-bit correction values MRA are stored with respect to the MR heads having head numbers "00" through "20". Similarly, it is also possible to store such a MRA table in the MRA register 27, and supply the correction value MRA corresponding to each MR head to the A/D converter 23.

In addition, the setting of the correction value MRA to the MRA register 27 may be made when shipping the magnetic disk unit, every time the power of the magnetic disk unit is turned ON, for every predetermined period, when an error is generated, and when a number of times an error is generated exceeds a predetermined value, for example. In other words, the correction value MRA may be set to the MRA register 27 and updated at an arbitrary timing.

Further, the present invention is not limited to these embodiments, but various variations and modifications may be made without departing from the scope of the present invention.

What is claimed is:

1. A method of correcting an output waveform of a head, comprising the steps of:
   (a) obtaining a sample error value of a sample value when subjecting an analog signal output from a head to an analog-to-digital conversion; and
   (b) correcting a vertical asymmetry of a waveform of the analog signal when carrying out the analog-to-digital conversion by changing a corresponding relationship between the analog signal and a digital signal which is obtained by the analog-to-digital conversion based on the sample error value;
   wherein said step (b) calculates a correction value with respect to the analog-to-digital conversion based on the sample error value, and changes an input range of the analog-to-digital conversion to become vertically asymmetric depending on the correction value.

2. The method of correcting the output waveform of the head as claimed in claim 1, wherein said step (a) sets the correction value to 0 when obtaining the sample error value.

3. The method of correcting the output waveform of the head as claimed in claim 2, wherein said step (b) calculates a ratio of amplitudes of a positive polarity portion and a negative polarity portion of the waveform of the analog signal based on the sample error value, and obtains the correction value from the ratio.

4. The method of correcting the output waveform of the head as claimed in claim 1, wherein said step (b) calculates a ratio of amplitudes of a positive polarity portion and a negative polarity portion of the waveform of the analog signal based on the sample error value, and obtains the correction value from the ratio.

5. The method of correcting the output waveform of the head as claimed in claim 1, wherein said step (a) obtains the samples error value by adding errors with respect to a ternary target value of a sample value.

6. A magnetic disk unit comprising:
   at least one head reading a signal from a magnetic disk;
   an analog-to-digital converter subjecting an analog signal output from said head to an analog-to-digital conversion; and
   a sample error measuring circuit measuring a sample error value of a sample value when subjecting the analog signal to the analog-to-digital conversion, based on an output of said analog-to-digital converter,
   said analog-to-digital converter correcting a vertical asymmetry of a waveform of the analog signal when carrying out the analog-to-digital conversion by changing a corresponding relationship between the analog signal and a digital signal which is obtained by the analog-to-digital conversion based on the sample error value;
   a processor calculating a correction value with respect to the analog-to-digital conversion based on the sample error value, said analog-to-digital converter changing an input range of the analog-to-digital conversion to become vertically asymmetric depending on the correction value.

7. The magnetic disk unit as claimed in claim 6, wherein said sample error measuring circuit sets the correction value to 0 when obtaining the sample error value.

8. The magnetic disk unit as claimed in claim 7, wherein said processor calculates a ratio of amplitudes of a positive polarity portion and a negative polarity portion of the waveform of the analog signal based on the sample error value, and obtains the correction value from the ratio.

9. The magnetic disk unit as claimed in claim 7, which further comprises:
   a register storing the correction value,
   said processor obtaining the correction value at an arbitrary timing and setting the correction value in said register, so as to set and update the correction value at the arbitrary timing.

10. The magnetic disk unit as claimed in claim 7, wherein a plurality of heads are provided, and said analog-to-digital converter corrects the vertical asymmetry of the waveform of the analog signal with respect to each of the heads.

11. The magnetic disk unit as claimed in claim 10, wherein said processor calculates a ratio of amplitudes of a positive polarity portion and a negative polarity portion of the waveform of the analog signal based on the sample error value, and obtains the correction value from the ratio.

12. The magnetic disk unit as claimed in claim 11, which further comprises:

a register storing the correction value, said processor obtaining the correction value at an arbitrary timing and setting the correction value in said register, so as to set and update the correction value at the arbitrary timing.

13. The magnetic disk unit as claimed in claim 11, wherein a plurality of heads are provided, and said analog-to-digital converter corrects the vertical asymmetry of the waveform of the analog signal with respect to each of the heads.

14. The magnetic disk unit as claimed in claim 10, which further comprises:

a register storing the correction value, said processor obtaining the correction value at an arbitrary timing and setting the correction value in said register, so as to set and update the correction value at the arbitrary timing.

15. The magnetic disk unit as claimed in claim 14, wherein a plurality of heads are provided, and said analog-to-digital converter corrects the vertical asymmetry of the waveform of the analog signal with respect to each of the heads.

16. The magnetic disk unit as claimed in claim 6, wherein a plurality of heads are provided, and said analog-to-digital converter corrects the vertical asymmetry of the waveform of the analog signal with respect to each of the heads.

17. The magnetic disk unit as claimed in claim 11, wherein a plurality of heads are provided, and said analog-to-digital converter corrects the vertical asymmetry of the waveform of the analog signal with respect to each of the heads.

18. The magnetic disk unit as claimed in claim 6, wherein said sample error measuring circuit measures the sample error value by adding errors with respect to a ternary target value of the sample value.

* * * * *